Oct. 20, 1953          R. LEE          2,656,175
INERTIA DIFFERENTIALLY MODIFIED GOVERNOR
Filed May 12, 1951
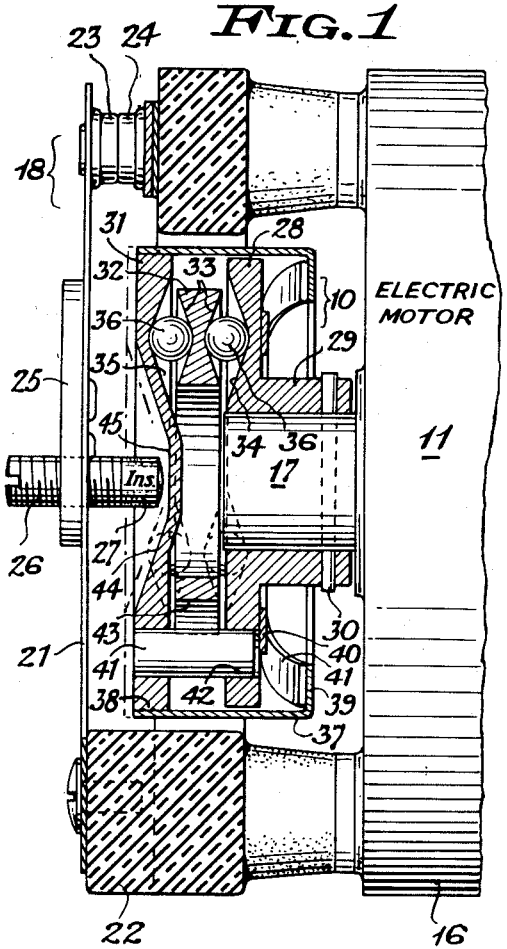
FIG. 1
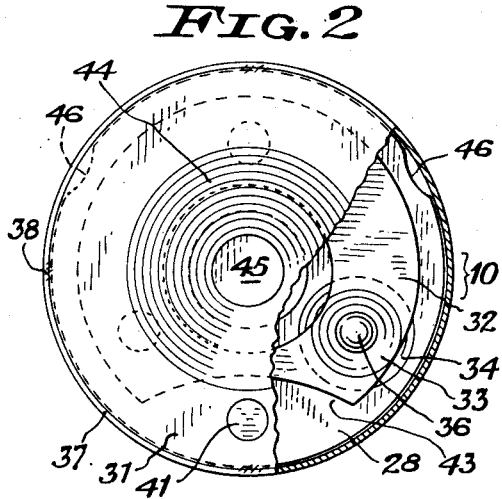
FIG. 2
FIG. 3
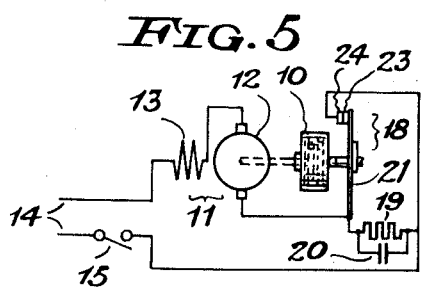
FIG. 5
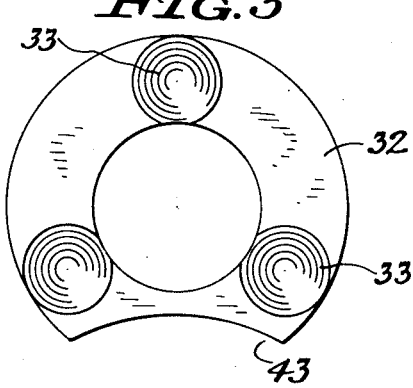
FIG. 4
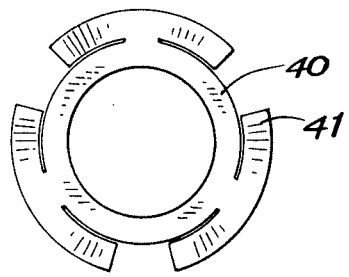
INVENTOR
ROYAL LEE
BY *Christopher L. Waal*
        ATTORNEY

Patented Oct. 20, 1953

2,656,175

UNITED STATES PATENT OFFICE 2,656,175

INERTIA DIFFERENTIALLY MODIFIED GOVERNOR

Royal Lee, Elm Grove, Wis., assignor to Lee Engineering Company, Milwaukee, Wis., a corporation of Wisconsin Application May 12, 1951, Serial No. 225,945

9 Claims. (Cl. 264—6)

The present invention relates to speed governors adapted for controlling the speed of rotary devices, such as electric motors.

An object of the invention is to provide an improved speed governor of the inertia or acceleration-responsive type which will afford sensitive regulation and minimize hunting.

Another object is to provide a speed governor of this type which will operate equally well in either direction of rotation.

A further object is to provide a speed governor having improved anti-friction means for mounting an inertia member thereof and for transmitting the regulating force.

A still further object is to provide a speed governor which is of simple and durable construction and which is capable of easy and inexpensive manufacture.

The invention further consists in the several features hereinafter described and claimed.

In the accompanying drawing,

Fig. 1 is a longitudinal sectional view of a speed governor of the invention applied to an electric motor;

Fig. 2 is an end view of the governor, parts being broken away and parts being shown in section;

Fig. 3 is a detail view of a rotatable inertia member of the governor;

Fig. 4 is a detail view of a governor loading spring, and

Fig. 5 is a wiring diagram of a motor circuit controlled by the governor.

In the drawing, the speed governor of the invention, designated generally by the numeral 10 and hereinafter more fully described, is shown to be applied to an electric motor 11 for regulating the speed of the motor. By way of example, the motor may be of the series or universal type, as indicated in Fig. 5, although the governor is applicable to other forms of motors. The motor illustrated has an armature winding 12 and a series field winding 13 and is supplied with current from line conductors 14, one of which has an on-off switch 15. The motor has a frame 16 in which is journalled an armature shaft 17. The governor 10, which is mounted on the shaft 17 and is driven thereby, controls the motor speed by effecting actuation of a circuit-closer 18 in circuit with the motor. The circuit-closer may be of various types, as is well understood in this art, and is here shown to be connected in series with the motor and to be shunted by a resistor 19 and a condenser 20. By way of example, the circuit-closer includes a leaf spring or reed 21 which extends diametrically of the motor beyond the end of the motor shaft and is secured at one end to a stationary insulating ring 22 which surrounds the governor and is fastened to the motor frame. The other or free end of the leaf spring carries a contact 23 which cooperates with a stationary contact 24 supported on the ring. The leaf spring carries a plate 25 in which is adjustably threaded and gripped a screw 26 extending axially of the motor shaft. The screw is provided with a button 27, as of fibre or Bakelite, adapted to be engaged and displaced by the governor 10, as hereinafter described, to effect intermittent or periodic opening of the circuit-closer 18 so as to regulate the speed of the motor.

The governor 10 includes a rotary disk member 28 with a hub 29 which is suitably secured to the projecting end of the motor shaft 17, as by a cross pin 30. An axially shiftable disk member 31 is spaced axially from the disk member 28, and an inertia element 32 in the form of an annular disk member is interposed between the disk members 28 and 31. The inertia disk member 32 is provided in its opposite faces with a plurality of recesses or concave pockets 33, preferably of conical shape, three equally spaced sets of recesses being shown, and the recesses of each set being in alignment. The disk members 28 and 31 are provided with respective sets of similar concave recesses or pockets 34 and 35 which confront the recesses 33 of the inertia disk member, each set of recesses 34 and 35 being arranged in a circle concentric with the motor shaft. The conical wall of each recess extends at a suitable angle to the plane of rotation. By way of example, this angle may be of the order of 19°. Balls 36 are seated in the respective pairs of confronting recesses and are adapted to roll on the conical surfaces of these recesses. Preferably, the bottom of each recess has a radius substantially equal to that of the associated ball.

A cylindrical sheet metal housing member 37 loosely surrounds the disk member 28 and has an end portion secured, as by a press fit and spot welding 38, to the periphery of the disk member 31. The other end of the housing member has an inturned flange 39 spaced from the disk member 28. An annular spring plate 40 with bent resilient fingers 41 is interposed between the disk 28 and the flange 39, the spring plate bearing against the disk member 28 and the free ends of the fingers bearing against the flange, thus urging the disk member 31 toward the disk member 28 to hold the balls 36 under pressure against the inertia disk member 32. This spring pressure biases the balls to the centers of the conical pockets when the governor is at rest, as seen in Fig. 1.

A guide pin 41 extending parallel to the axis of the motor shaft is rigidly secured to the disk member 31, as by a press fit therein, and has a sliding fit in a bore 42 formed in the disk member 28, thus providing a driving connection between the disk members 28 and 31 while permitting axial displacement of the disk member 31. The annular inertia disk member 32 has a notch or cut away portion 43 to clear the guide pin and to shift the center of gravity of the inertia disk member away from the geometrical axis of this disk member. One guide pin is sufficient, although, if desired, two or more guide pins may be provided. While the guide pin is preferably secured in the disk member 31 and slidable in the disk member 28, this relation may be reversed.

At its outer side the disk member 31 has a central frusto-conical pocket 44 with a flat, central abutment face 45 normal to the axis of rotation. The abutment face 45 is adapted to engage the button 27 of the leaf spring for the motor circuit-closer to open this circuit-closer when the governor attains a predetermined speed.

The governor unit as a whole may be dynamically balanced in any suitable manner, as by removing material from the disk member 28 at the points 46.

In the operation of the governor, the rotation of the motor shaft in either direction imposes a centrifugal force on the floating rotary inertia disk member 32, causing this member to shift radially against the pressure of the spring-urged balls 36 on the inclined surfaces of the conical recesses 33, 34, and 35. During this radial displacement of the inertia member, the balls roll on the inclined surfaces, thereby forcing the disk member 31 axially away from the disk member 28, as to the broken line position of Fig. 1. In the acceleration of the governor from its position of rest, the rotary inertia disk member 32 tends to lag behind its normal position with respect to the disk members 28 and 31, thereby causing the balls to roll in a tangential or peripheral direction on the conical surfaces and effecting outward axial movement of the disk member 31. The axial displacement of the disk member 31 is thus produced by both radial and tangential components of displacement of the inertia member 32. The abutment of the disk member 31 with the button 27 of the circuit-closer 12 causes opening of the circuit-closer contacts, thus reducing the motor current and preventing further increase in motor speed. The motor speed then drops slightly, but the inertia member tends to maintain its previous angular velocity, thus causing the balls to roll toward deeper parts of the conical recesses so as to effect prompt axial retraction of the disk member 31 and consequent reclosing of the circuit-closer contacts. The motor speed again increases slightly, and the cycle of operation is repeated. By the action of the governor the spring-mounted contact 23 vibrates at a sufficiently high frequency to cause the motor speed to remain substantially constant. By reason of the tangential inertia effect of the floating rotary inertia member 32, the governor is quickly responsive to changes in acceleration of the motor shaft, thus insuring good speed regulation and minimizing hunting. The rollable balls not only provide an anti-friction support for the inertia disk member 32, but also transmit the regulating force.

During normal operation of the governor, the radial and angular displacement of the inertia disk member from its position of rest is such that the balls will remain in the associated pockets. However, under abnormal conditions the maximum radial displacement of the inertia disk member will be limited by abutment thereof with the housing 37, and the maximum angular lead or lag of the inertia disk member will be limited by abutment thereof with the guide pin 41, so as to prevent the balls from leaving the pockets.

The circuit-closer or other control instrumentality actuated by the governor may assume various forms. Certain other types of circuit-closers which may be used are disclosed in my Patent No. 2,353,314 for Speed Regulating Apparatus, issued July 11, 1944.

For many applications the governor is set to operate at some single predetermined speed. However, the speed setting of the governor can be adjusted in various ways, as by screwing the adjusting screw 26 in or out, or by changing the spring pressure of the governor, the latter method of adjustment being preferred as balancing of the governor will be simplified.

The various parts of the governor unit are preferably formed of metal, and are of relatively simple shape, facilitating manufacture and assembly. The several disk members lend themselves to fabrication from cast, stamped, or powdered metal.

What I claim as new and desire to secure by Letters Patent is:

1. In a speed governor, the combination of a pair of coaxial rotary members one of which is axially movable with respect to the other, said rotary members being rotatable in either direction, centrifugally-responsive and acceleration-responsive inertia means rotatable with and disposed between said rotary members and having a degree of freedom of radial and tangential displacement with respect to said rotary members, rollable balls interposed between said inertia means and rotary members, said inertia means and rotary members having inclined surfaces engageable by said balls and on which said balls roll during relative radial and tangential displacement of said inertia means for effecting axial displacement of said axially movable rotary member, and resilient means axially urging said rotary members toward said inertia means and holding said balls against said inclined surfaces.

2. In a speed governor, the combination of rotary means including a pair of coaxial rotary disks one of which is axially shiftable, resilient means urging said disks axially toward each other, an inertia member between and rotatable with said disks and having a limited freedom of radial and relative angular displacement, said inertia member and disks having confronting recesses at a distance from the axis of rotation, said recesses presenting inclined surfaces of generally conical shape, balls interposed between said inertia member and disks and rollably seated on said inclined surfaces under the pressure of said resilient means to support said inertia member and to transmit the regulating force of said inertia member to said axially shiftable disk.

3. In a speed governor, the combination of rotary means including a pair of coaxial rotary disks one of which is axially shiftable, a housing secured to one of said disks and surrounding the other disk and having an inwardly projecting flange, spring means interposed between said flange and the adjacent disk and urging said disks axially toward each other, an inertia member between and rotatable with said disks and having a limited freedom of radial and relative angular displacement, said inertia member and disks having confronting recesses at a distance from the axis of rotation, said recesses presenting inclined surfaces of generally conical shape, balls interposed between said inertia member and disks and rollably seated on said inclined surfaces under the pressure of said resilient means to support said inertia member and to transmit the regulating force of said inertia member to said axially shiftable disk.

4. In a speed governor, the combination of rotary means including a pair of coaxial rotary members one of which is axially shiftable, resilient means urging said rotary members axially toward each other, an inertia member between and rotatable with said rotary members and having a limited freedom of radial and relative angular displacement, said inertia member and rotary members having confronting recesses at a distance from the axis of rotation, said recesses presenting inclined surfaces of generally conical shape, balls interposed between said inertia member and rotary members and rollably seated on said inclined surfaces under the pressure of said resilient means to yieldably support said inertia member against radial displacement and to transmit the regulating force of said inertia member to said axially shiftable rotary member.

5. In a speed governor, the combination of rotary means, speed-responsive inertia means rotatable with said rotary means and having a limited freedom of radial and tangential displacement with respect to said rotary means, supporting means for said displaceable inertia means including rollable balls and concave surfaces of conical shape engaged by said rollable balls, resilient means holding said rollable balls against said concave surfaces, and means responsive to the displacement of said rollable balls on said concave surfaces.

6. In a speed governor, the combination of rotary means including an axially movable member, speed-responsive inertia means rotatable with said rotary means and having a limited freedom of radial and tangential displacement with respect to said rotary means, means for transmitting the regulating force of said inertia means to said axially movable member comprising rollable supporting balls for said inertia means and laterally facing concave surfaces of conical shape engaged by said rollable balls, and resilient means holding said rollable balls against said concave surfaces.

7. In a speed governor, the combination of rotary means including a pair of rotary members one of which is axially displaceable, an annular inertia member between and rotatable with said rotary members and having a limited freedom of radial and rotative displacement with respect to said rotary members, said inertia member having in its opposite sides a plurality of recesses presenting inclined surfaces of generally conical shape, and said rotary members each having a plurality of recesses confronting the recesses in said inertia member and presenting inclined surfaces of generally conical shape, balls rollably seated in the respective pairs of confronting recesses, and resilient means axially urging said rotary members toward each other to hold the balls against said inclined surfaces, said balls being rollable on said inclined surfaces by the displacements of said inertia member to effect axial shifting of said axially displaceable rotary member.

8. In a speed governor, the combination of rotary means including a pair of rotary members one of which is axially shiftable, resilient means urging said rotary members toward each other, inertia means rotatable with and disposed between said rotary members and having a degree of freedom of radial and tangential displacement with respect to said rotary members, said inertia means having concave recesses of conical shape at opposite sides spaced from the axis of rotation and presenting inclined surfaces, and said rotary members having concave recesses of conical shape confronting said first-named recesses and presenting inclined surfaces, balls interposed between said inertia means and rotary members and rollably engaging the inclined surfaces of the confronting concave recesses under the pressure of said resilient means, said balls being rollable on said inclined surfaces by the displacement of said inertia means to effect axial displacement of said axially shiftable rotary member.

9. In a speed governor, the combination of rotary means including a pair of rotary members one of which is axially shiftable, a guide member extending parallel to the axis of rotation and drivingly connecting said rotary members, speed-responsive inertia means rotatable with said rotary means and disposed between said rotary members, said inertia means having a limited freedom of radial and tangential displacement with respect to said rotary means and having conically recessed portions, and balls interposed between said rotary members and inertia means and cooperating with the conically recessed portion of said inertia means for axially translating the displacements of said inertia means to said axially shiftable rotary member.

ROYAL LEE.

References Cited in the file of this patent

UNITED STATES PATENTS

| Number | Name | Date |
|--------|------|------|
| 754,563 | Holzwarth | Mar. 15, 1904 |
| 1,357,403 | Kimble | Nov. 2, 1920 |
| 1,618,644 | Dickson | Feb. 22, 1927 |
| 1,777,354 | Dina | Oct. 7, 1930 |
| 2,187,202 | Henry | Jan. 16, 1940 |
| 2,444,630 | Brown | July 6, 1948 |

FOREIGN PATENTS

| Number | Country | Date |
|--------|---------|------|
| 151,935 | Germany | June 2, 1904 |
| 362,832 | Germany | Nov. 2, 1922 |
| 416,647 | Germany | July 22, 1925 |
| 702,157 | Germany | Jan. 31, 1941 |